(12) United States Patent
da Silva et al.

(10) Patent No.: US 11,839,920 B2
(45) Date of Patent: Dec. 12, 2023

(54) MODULAR DRILL AND METHOD FOR USING A MODULAR DRILL

(71) Applicant: KENNAMETAL INC., Latrobe, PA (US)

(72) Inventors: Marcelo Euripedes da Silva, Piracicaba (BR); Patrick Kuhlemann, Fuerth (DE); Christoph Gey, Stetten (CH); Michael Schuffenhauer, Fuerth (DE); Berthold Heinrich Zeug, Fuerth (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 17/361,120

(22) Filed: Jun. 28, 2021

(65) Prior Publication Data

US 2022/0410278 A1 Dec. 29, 2022

(51) Int. Cl.
*B23B 51/00* (2006.01)
*B23B 27/16* (2006.01)
*B23B 35/00* (2006.01)

(52) U.S. Cl.
CPC .......... *B23B 27/1611* (2013.01); *B23B 35/00* (2013.01)

(58) Field of Classification Search
CPC ..... B23B 51/00; B23B 51/02; B23B 51/0004; B23B 2251/02; B23B 2251/50; Y10T 408/907; Y10T 408/909; Y10T 408/9093; Y10T 408/9095; Y10T 408/9097; Y10T 408/9098; Y10T 408/90987; Y10T 408/90993; Y10T 408/892
See application file for complete search history.

(56) References Cited

U.S. PATENT DOCUMENTS

| 1,413,280 | A | * | 4/1922 | Kengel | B23B 31/113 |
| | | | | | 403/349 |
| 1,461,548 | A | * | 7/1923 | West | B23B 51/00 |
| | | | | | 408/144 |
| 1,783,541 | A | * | 12/1930 | Hogg | B23B 31/103 |
| | | | | | 279/83 |
| 2,039,855 | A | * | 5/1936 | Stone | B23B 31/113 |
| | | | | | 279/83 |
| 2,079,460 | A | * | 5/1937 | Marty | F16D 3/54 |
| | | | | | 403/336 |
| 2,167,014 | A | * | 7/1939 | Verderber | B23B 31/1076 |
| | | | | | 279/83 |

(Continued)

FOREIGN PATENT DOCUMENTS

DE 102006028408 A1 10/2007
EP 1358979 11/2003

(Continued)

OTHER PUBLICATIONS

May 11, 2023 Foreign Office Action German Application No. DE202210115830 (Pub No. DE102022115830A1), 10 Pages.

*Primary Examiner* — Nicole N Ramos
(74) *Attorney, Agent, or Firm* — Christopher J. Owens

(57) ABSTRACT

A modular drill including a shank having a shank bore therein, a guide pin tip disposed in the shank bore, a cutting tip, and a connection shaft coupled to the cutting tip, the connection shaft having a connection shaft sidewall and a guide path therein for guiding the guide pin tip therethrough while the connection shaft moves through the shank bore.

20 Claims, 13 Drawing Sheets

(56) References Cited

U.S. PATENT DOCUMENTS

| | | | | |
|---|---|---|---|---|
| 2,731,273 | A | * | 1/1956 | Edens .................. B23B 31/113 279/81 |
| 3,707,303 | A | * | 12/1972 | Petri ..................... F16B 21/165 403/328 |
| 3,747,946 | A | * | 7/1973 | Edens ............... B23B 31/10741 279/81 |
| 4,134,704 | A | * | 1/1979 | Jackley .................. B23B 51/00 408/59 |
| 4,563,116 | A | * | 1/1986 | Edens .................... F16D 1/108 279/81 |
| 4,655,651 | A | * | 4/1987 | Hunger ............... B25D 17/088 279/19.5 |
| 4,674,172 | A | * | 6/1987 | Botimer ................ B23B 31/113 279/900 |
| 4,906,147 | A | * | 3/1990 | Friesinger ............. B23B 31/113 279/97 |
| 5,090,275 | A | * | 2/1992 | McCann ................. B25B 23/00 81/177.85 |
| 5,904,455 | A | | 5/1999 | Krenzer et al. |
| 6,012,881 | A | | 1/2000 | Scheer |
| 7,070,367 | B2 | | 7/2006 | Krenzer |
| 7,377,730 | B2 | | 5/2008 | Hecht et al. |
| D579,033 | S | * | 10/2008 | Miller .......................... D15/139 |
| 7,896,589 | B2 | * | 3/2011 | Miller .................. B23B 31/005 279/81 |
| 7,896,590 | B2 | * | 3/2011 | Miller ................ B23B 51/0473 279/81 |
| 7,972,094 | B2 | | 7/2011 | Men et al. |
| 8,449,227 | B2 | | 5/2013 | Danielsson |
| 8,534,963 | B2 | * | 9/2013 | Luik ........................ B23C 3/28 407/34 |
| 8,784,018 | B2 | | 7/2014 | Pabel |
| 8,840,347 | B2 | | 9/2014 | Aare |
| 9,205,498 | B2 | | 12/2015 | Jaeger |
| 10,213,845 | B2 | | 2/2019 | Schwägerl et al. |
| 2006/0051172 | A1 | | 3/2006 | Johnson et al. |
| 2010/0322723 | A1 | | 12/2010 | Danielsson |
| 2011/0110739 | A1 | | 5/2011 | Frisendahl |
| 2011/0236145 | A1 | | 9/2011 | Päbel et al. |
| 2015/0306686 | A1 | * | 10/2015 | Mani ...................... B23B 51/02 407/40 |
| 2015/0360300 | A1 | | 12/2015 | Hecht |
| 2019/0126361 | A1 | | 5/2019 | Hecht et al. |
| 2020/0180047 | A1 | * | 6/2020 | Jager .................. B23B 31/1075 |

FOREIGN PATENT DOCUMENTS

| | | |
|---|---|---|
| JP | 11-197923 | 7/1999 |
| JP | 2002-113606 | 4/2002 |
| JP | 2006150508 A | 6/2006 |

\* cited by examiner

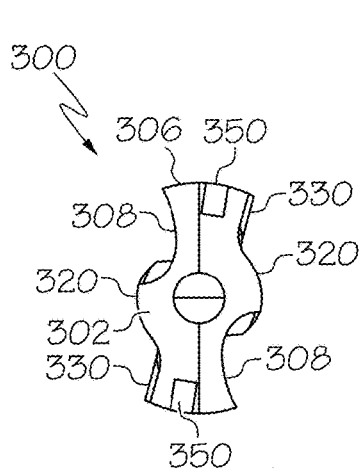
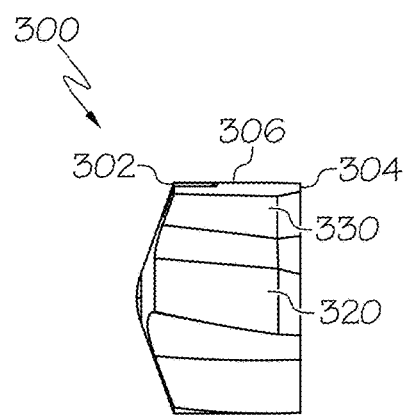
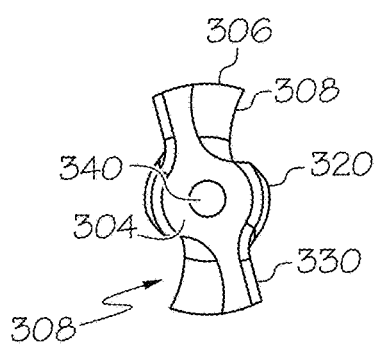
FIG. 5A  FIG. 5B  FIG. 5C
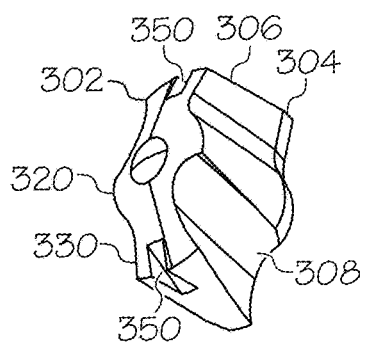
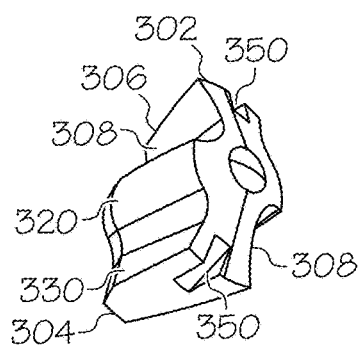
FIG. 5D  FIG. 5E
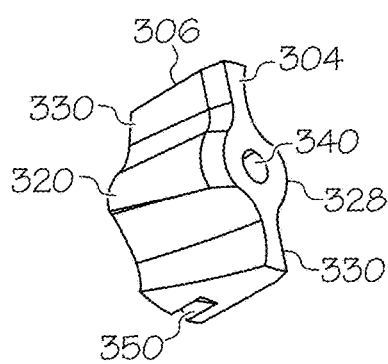
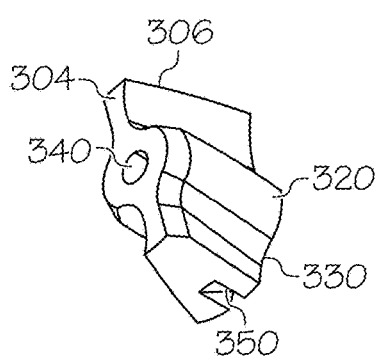
FIG. 5F  FIG. 5G

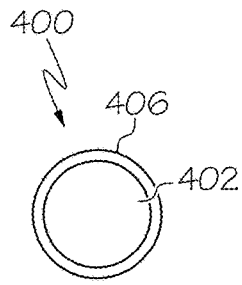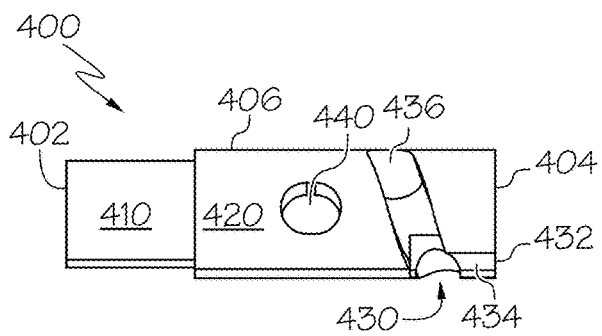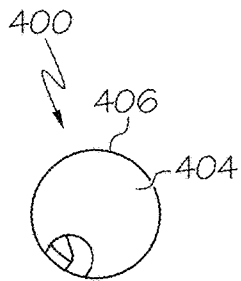
FIG. 6A  FIG. 6B  FIG. 6C
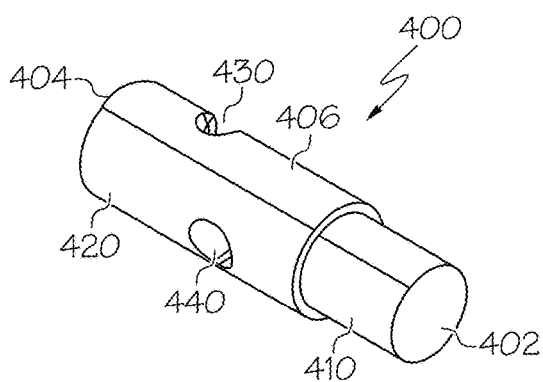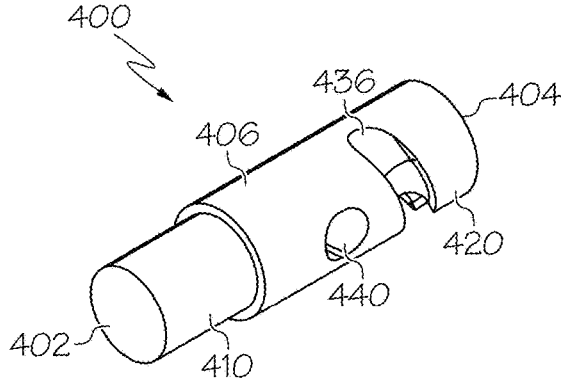
FIG. 6D  FIG. 6E
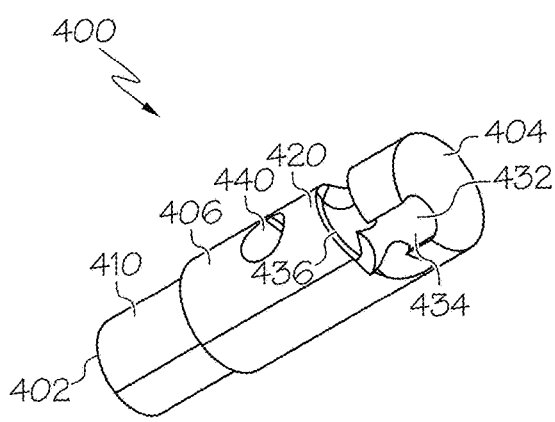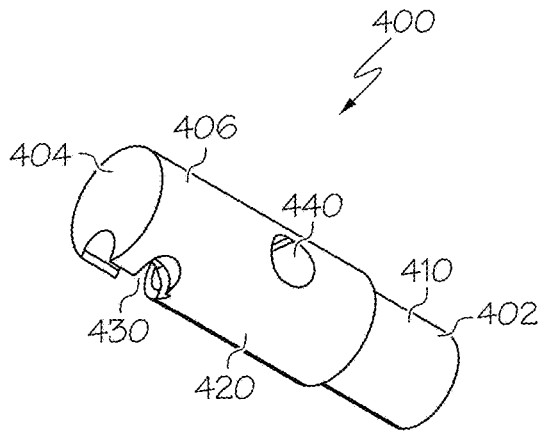
FIG. 6F  FIG. 6G

MODULAR DRILL AND METHOD FOR USING A MODULAR DRILL

FIELD

The present application relates to the field of modular drills.

BACKGROUND

According to the related art, there are modular drills having a shank and a cutting tip clamped in the shank. A challenge with these related art modular drills include that a clamping force can be reduced due to high cutting forces during a drilling process, thermal variations, side forces or vibration, thereby loosening the cutting tip or reducing a life of the cutting tip.

Accordingly, those skilled in the art continue with research and development in the field of modular drills.

SUMMARY

In one embodiment, a modular drill includes a shank having a shank bore therein, a guide pin tip disposed in the shank bore, a cutting tip, and a connection shaft coupled to the cutting tip. The connection shaft has a guide path therein for guiding the guide pin tip therethrough while the connection shaft moves through the shank bore.

In an aspect, the shank includes a plurality of shank flutes. In another aspect, the cutting tip includes a plurality of cutting tip flutes. In yet another aspect, the shank includes a plurality of shank flanks for clamping the cutting tip therebetween. In yet another aspect, the plurality of shank flanks each include a flank front surface and flank back surface. In yet another aspect, the cutting tip includes a cutting tip shoulder surface and a cutting tip counter surface. In yet another aspect, the modular drill further includes a locking pin. In yet another aspect, the shank includes a locking pin through hole. In yet another aspect, the connection shaft includes a locking pin engagement feature.

In another embodiment, a method for using a modular drill includes moving a connection shaft through a shank bore of a shank, the connection shaft being coupled to a cutting tip, the connection shaft having a guide path therein, and guiding a guide pin tip, which is disposed in the shank bore, through the guide path while the connection shaft moves through the shank bore of the shank.

In an aspect, moving the connection shaft through the shank bore of the shank includes inserting the connection shaft into the shank bore to assemble the modular drill. In another aspect, moving the connection shaft through the shank bore of the shank includes removing the connection shaft from the shank bore to disassemble the modular drill.

Other embodiments of the disclosed modular drill and method for using a modular drill will become apparent from the following detailed description, the accompanying drawings and the appended claims.

BRIEF DESCRIPTION OF THE DRAWINGS

FIG. 5A is a top view of the cutting tip of FIG. 1.

FIG. 5B is a side view of the cutting tip of FIG. 1.

FIG. 5C is a bottom view of the cutting tip of FIG. 1.

FIGS. 5D to 5G are perspective views of the cutting tip of FIG. 1.

FIG. 6A is a top view of the connection shaft of FIG. 1.

FIG. 6B is a side view of the connection shaft of FIG. 1.

FIG. 6C is a top view of the connection shaft of FIG. 1.

FIGS. 6D to 6G are perspective views of the connection shaft of FIG. 1.

DETAILED DESCRIPTION

In one embodiment of the present disclosure, a modular drill includes a shank having a shank bore therein, a guide pin tip disposed in the shank bore, a cutting tip, and a connection shaft coupled to the cutting tip. The connection shaft has a guide path therein for guiding the guide pin tip therethrough while the connection shaft moves through the shank bore.

FIGS. 1 to 11 illustrate one exemplary modular drill of the present disclosure.

Figure 1:
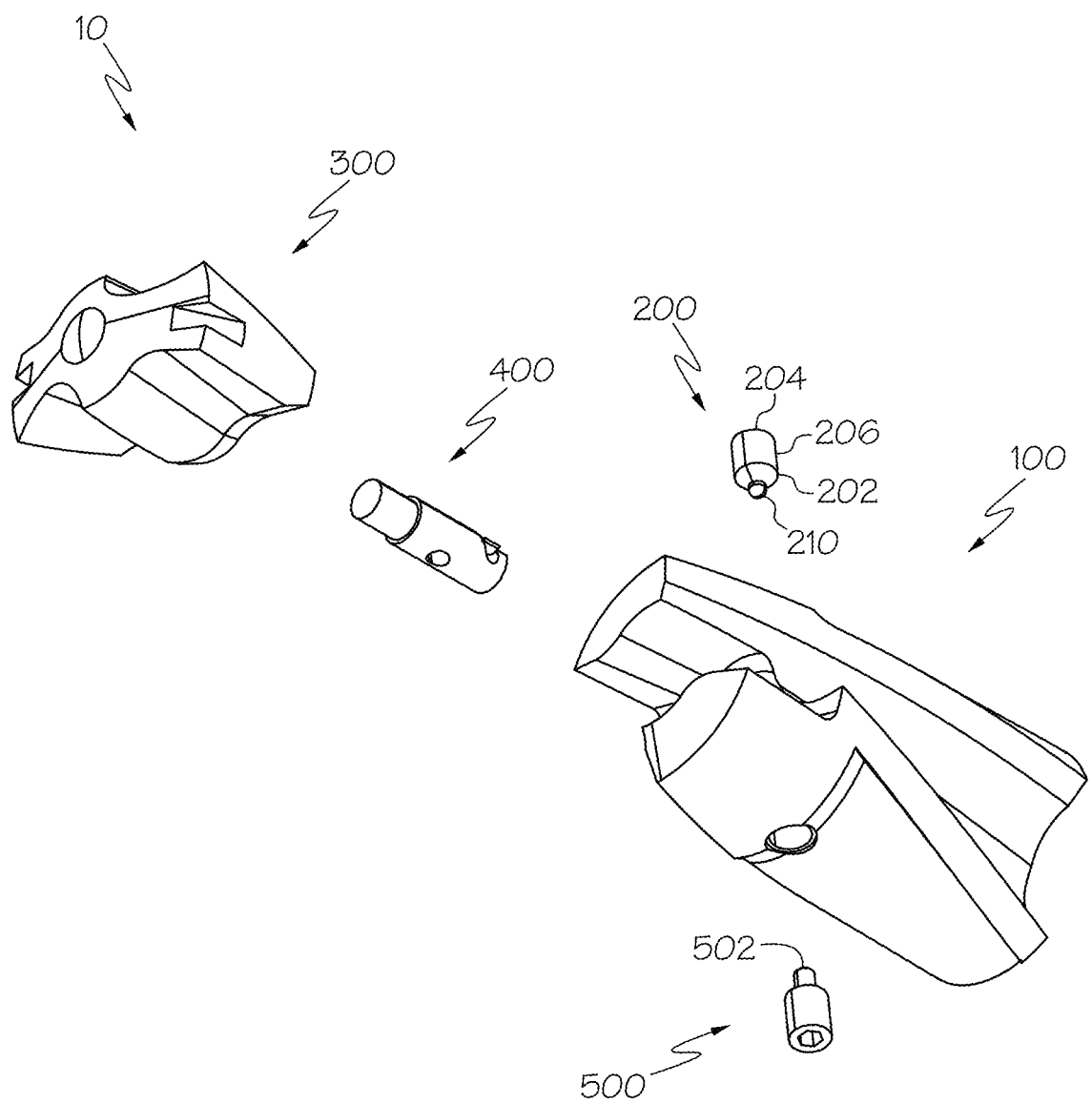
FIG. 1 is an exploded perspective view of an exemplary modular drill according to the present disclosure, including a shank, a guide pin, a cutting tip, a connection shaft, and a locking pin.
Figure 2:
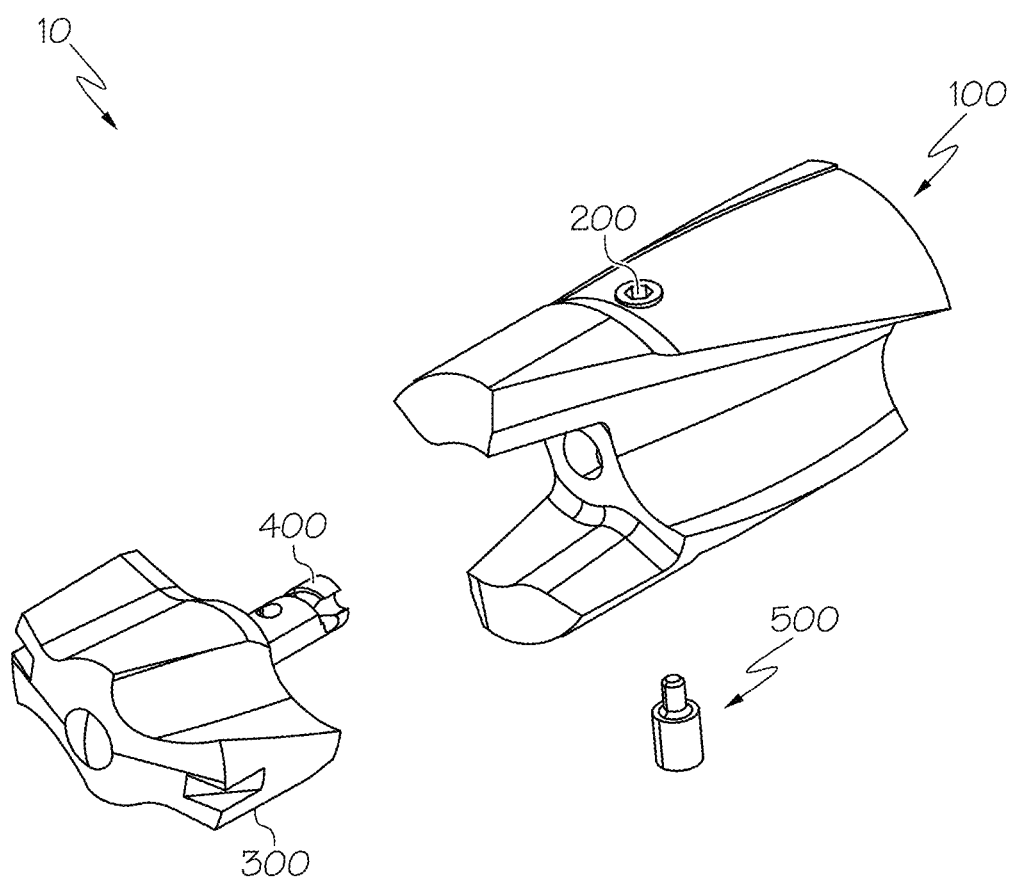
FIG. 2 is a partially assembled perspective view of the exemplary modular drill of FIG. 1.
Figure 3:
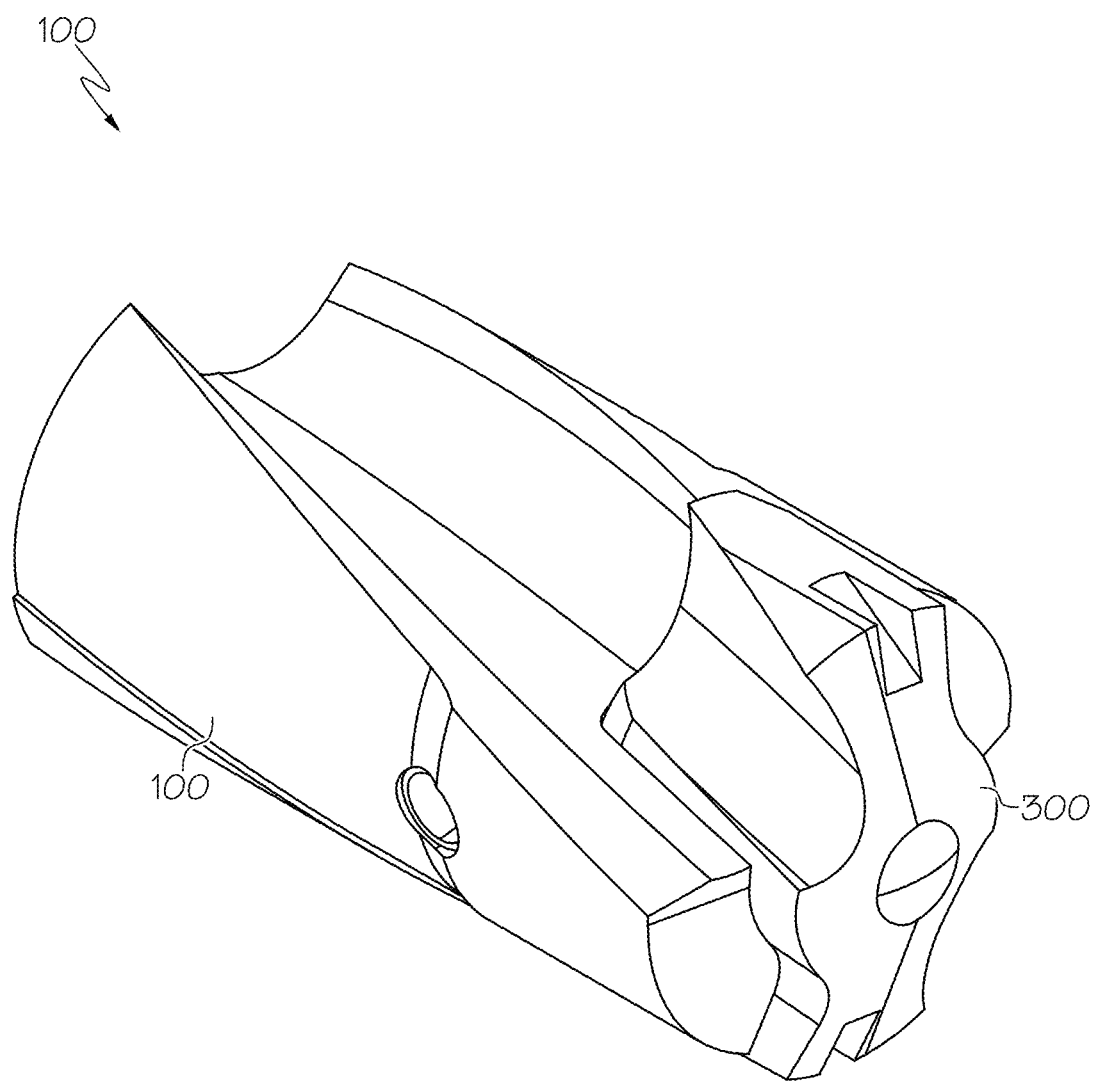
FIG. 3 is a fully assembled perspective view of the exemplary modular drill of FIG. 1.
Figure 4A:
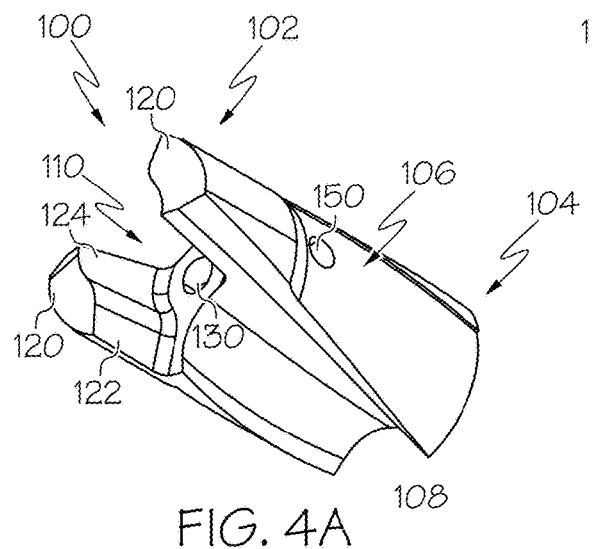
FIGS. 4A to 4D are perspective views of the shank of FIG. 1.
Figure 4B:
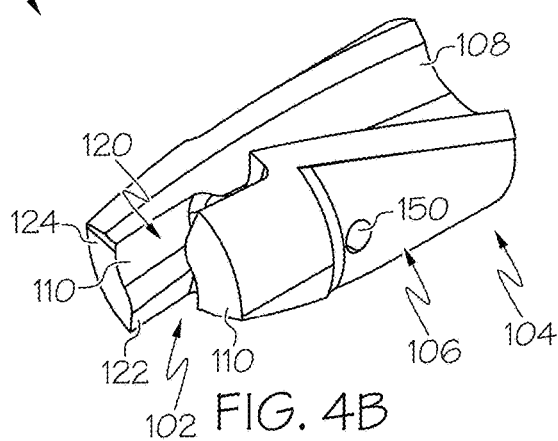
Figure 4C:
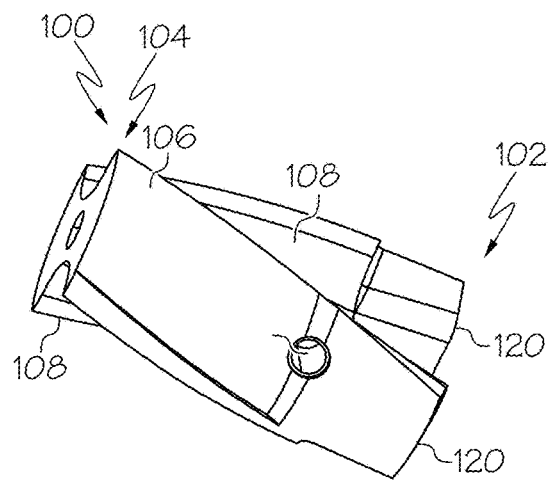
Figure 4D:
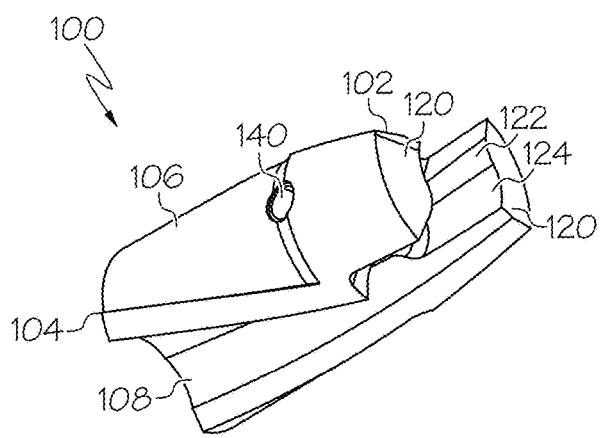
Figure 4E:
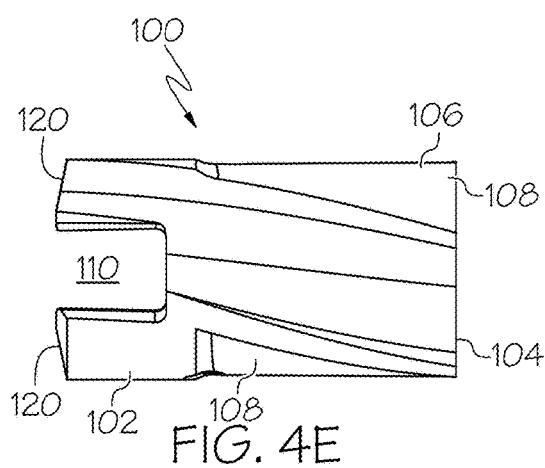
FIG. 4E is a side view of the shank of FIG. 1.
Figure 4F:
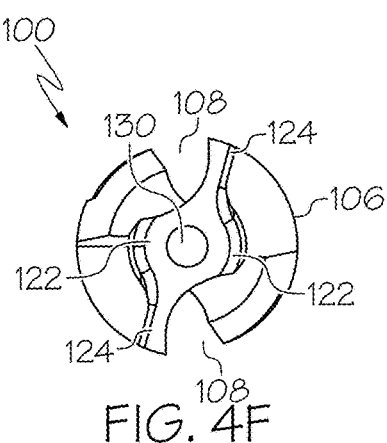
FIG. 4F is a top view of the shank of FIG. 1.
Figure 4G:
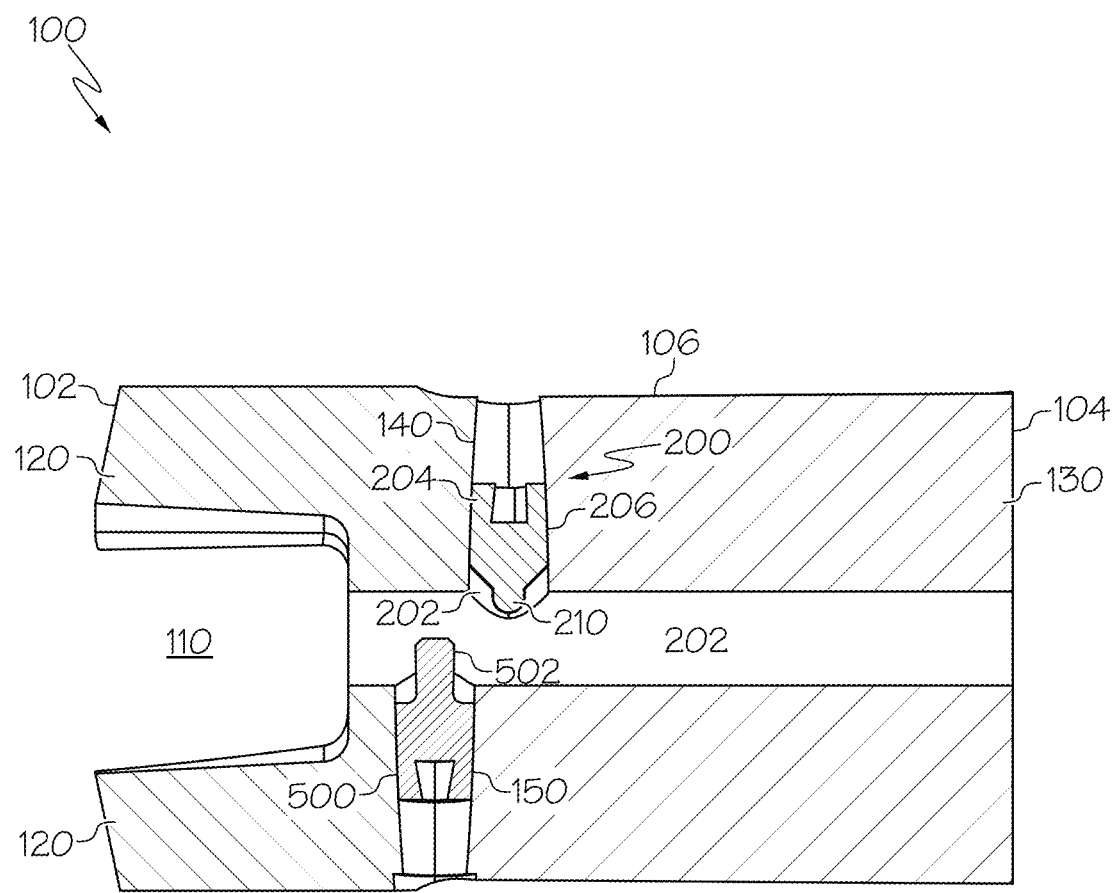
FIG. 4G is a sectional side view of the shank of FIG. 1.

Referring to FIGS. 1 to 3, the exemplary modular drill 10 includes a shank 100, a guide pin 200, a cutting tip 300, a connection shaft 400, and a locking pin 500. The modular drill 10 defines an axial direction 12 and a rotational direction 14.

The shank 100 includes an upper shank end 102, a lower shank end 104 opposite the upper shank end, and a shank sidewall 106 between the upper shank end 102 and the lower shank end 104. The shank sidewall 106 defines a plurality of shank flutes 108 that extend about the shank sidewall 106. The plurality of shank flutes 108 can vary in size, shape and number of flutes. The plurality of shank flutes 108 may aid in removal of waste material during a cutting process.

The shank 100 further includes a shank pocket 110 for seating the cutting tip 300 and includes shank flanks 120 at opposing sides of the shank pocket 110 for clamping the cutting tip 300 therebetween. An interior side of the shank flanks 120 include a flank front surface 122 and a flank rear surface 124.

The shank 100 further includes a shank bore 130 for receiving the connection shaft 400 therein. The shank further includes a guide pin hole 140 defining an opening to the shank bore 130 and a locking pin through hole 150 extending from the shank sidewall 106 to the shank bore 130. The locking pin through hole 150 is preferably a cylindrical hole, more preferably a threaded hole.

The shank 100 may be manufactured from a comparatively inexpensive material having a moderate hardness, such as steel or another metal.

Referring to FIG. 1, the guide pin 200 includes a guide pin front end 202, a guide pin rear end 204, and guide pin sidewall 206. The guide pin front end 202 defines a guide pin tip 210. The guide pin tip 210 may be, for example, spherical, conical, or cylindrical.

The guide pin 200 may be manufactured from a comparatively inexpensive material having a moderate hardness, such as steel or another metal.

For ease of manufacture, the shank 100 and guide pin 200 are formed as separate components, and the guide pin 200 is inserted and fixed within the guide pin hole 140 of the shank 100 such that the guide pin tip 210 is disposed in the shank bore 130. The guide pin 200 may be fixed within the guide pin hole 140 by any suitable process. By way of example, the guide pin 200 may be fixed within the guide pin hole 140 by providing an external thread around the guide pin 200 and an internal thread in the guide pin hole 140 and threading the guide pin 200 into the guide pin hole 140. The guide pin 200 may remain fixed in the guide pin hole 140 indefinitely unless in case of replacement due to wear. Alternatively, it is possible to omit the guide pin 200 and the guide pin hole 140. For example, the shank 100 and the guide pin tip 210 may be manufactured as a unitary component, such as by way of an additive manufacturing process.

The cutting tip 300 includes an upper cutting tip end 302, a lower cutting tip end 304 opposite the upper cutting tip end 302, and a cutting tip sidewall 306 between the upper cutting tip end 302 and the lower cutting tip end 304. The cutting tip sidewall 306 defines a plurality of cutting tip flutes 308 that extend about the cutting tip sidewall 306. When the cutting tip 300 is seated in the shank pocket 110, each cutting tip flute 308 is aligned with a shank flute 108.

The cutting tip sidewall 306 further includes a cutting tip shoulder surface 320 and a cutting tip counter surface 330. When the cutting tip 300 is being positioned in the shank pocket 110, the cutting tip shoulder surface 320 contacts the flank front surfaces 122 to elastically deform the shank flanks 120 radially outwardly. When the cutting tip shoulder surface 320 turns past the flank front surfaces 122, the shank flanks 120 return towards their undeformed position to clamp the cutting tip 300 therebetween to hold the cutting tip 300 in a seated positioned in the shank pocket 110. When the cutting tip 300 is in the seated position, the cutting tip counter surface 330 is positioned directly adjacent to the flank front surface 122 and the cutting tip shoulder surface 320 is positioned directly adjacent to the flank rear surface 124.

The cutting tip sidewall 306 further includes cutting tip connection bore 340 for receiving the connection shaft 400 therein and cutting tip torquing features 350 to facilitate a turning of the cutting tip 300. A custom wrench may be provided to engage with the cutting tip torquing features 350 to turn the cutting tip 300.

The cutting tip 300 may be manufactured from a harder and more expensive material, such as carbide, cermet, ceramics, and the like, which provides a good chip-removing capacity, good machining precision and long service life. In other words, the cutting tip 300 functions as a wear part that can be discarded after wear-out, while the shank 100 can be re-used with a new cutting tip 300.

The connection shaft 400 includes a connection shaft upper end 402, a connection shaft lower end 404 opposite the connection shaft upper end 402, and a connection shaft sidewall 406 between the connection shaft upper end 402 and the connection shaft lower end 404. The connection shaft sidewall 406 defines an upper connection portion 410 for connecting to the cutting tip 300 by insertion of the upper connection portion 410 into the cutting tip connection bore 340 and a lower connection portion 420 for connecting to the shank 100 by insertion of the lower connection portion 420 into the shank bore 130.

For ease of manufacture and cost-effectiveness, the cutting tip 300 and connection shaft 400 are formed as separate components, and the upper connection portion 410 of the connection shaft 400 is inserted and fixed within the cutting tip connection bore 340 such that the lower connection portion 420 extends below the lower cutting tip end 304. The upper connection portion 410 of the connection shaft 400 may be fixed within the cutting tip connection bore 340 by any suitable process. By way of example, the upper connection portion 410 of the connection shaft 400 may be fixed within the cutting tip connection bore 340 by providing an external thread around the upper connection portion 410 and an internal thread in the cutting tip connection bore 340 and threading the upper connection portion 410 into the cutting tip connection bore 340 and preferably after applying glue to the threads. To maintain tolerances, the profiles of the lower connection portion 420 should be machined after fixing the connection shaft 400 to the cutting tip 300. The connection shaft 400 as a separate component may be manufactured from a comparatively inexpensive material having a moderate hardness, such as steel or another metal. Alternatively, it is possible to manufacture the cutting tip 300 and connection shaft 400 as a unitary component.

The connection shaft 400 includes guide path 430 therein for guiding the guide pin tip 210 therethrough while the connection shaft 400 moves through the shank bore 130. The guide path 430 includes a guide path entrance 432, an axial guide path segment 434, and a circumferential guide path segment 436.

The connection shaft 400 further includes a locking pin engagement feature 440 for receiving the locking pin 500. For example, the locking pin engagement feature 440 may be a hole or notch in the connection shaft 400. In the case of a hole, the hole is preferably oblong to compensate for manufacturing tolerances.

The locking pin 500 including a locking pin tip 502, which may be, for example spherical, conical, or cylindrical. The locking pin 500 may be manufactured from a comparatively inexpensive material having a moderate hardness, such as steel or another metal.

It would be understood that the illustrated locking pin mechanism is one of many possibilities for locking the connection shaft 400 to the shank 100. The present disclose may include any locking mechanism for locking the connection shaft 400 to the shank 100. Alternatively, the locking mechanism may be omitted. The cutting tip 300 can be firmly held within the shank pocket 110 by the shank flanks 120 and engagement of the guide pin tip 212 with the guide path 430 while the modular drill 10 is cutting in the rotational direction 14.

A method for using a modular drill is described with reference to FIGS. 7 to 11.

Figure 7A:
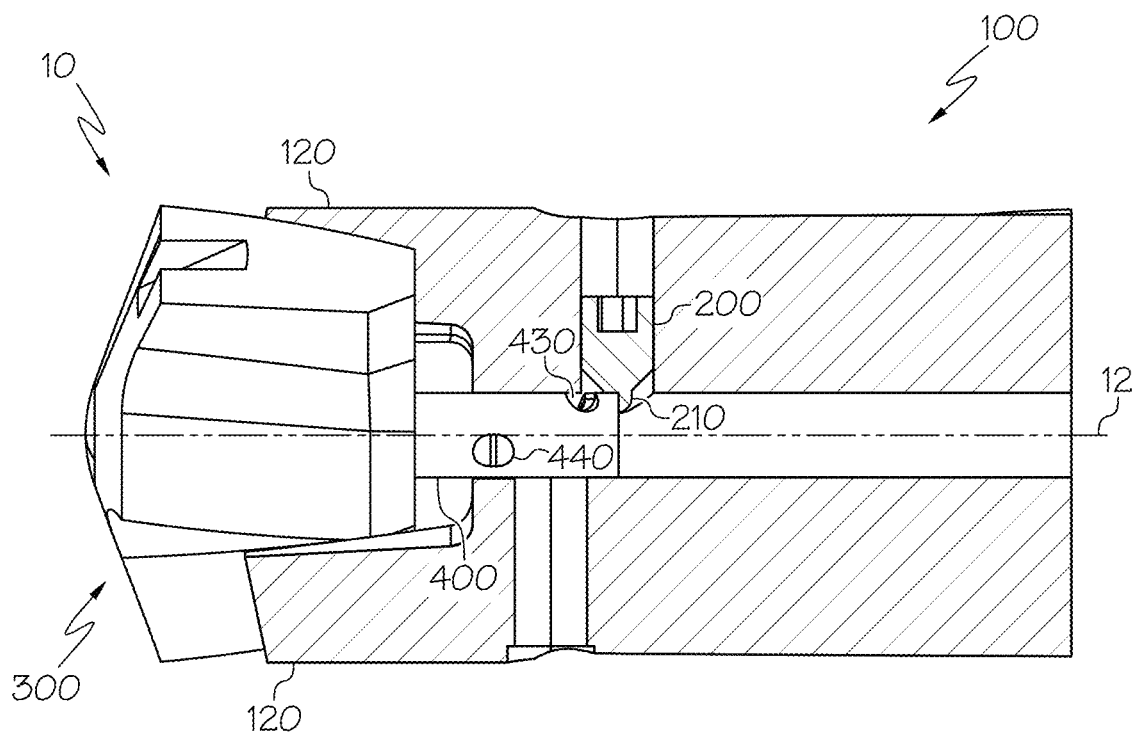
FIG. 7A is a sectional side view of the shank of FIG. 1 with non-sectional views of the cutting tip and connection shaft of FIG. 1, in which the cutting tip and connection shaft are starting to be inserted into the shank.
Figure 7B:
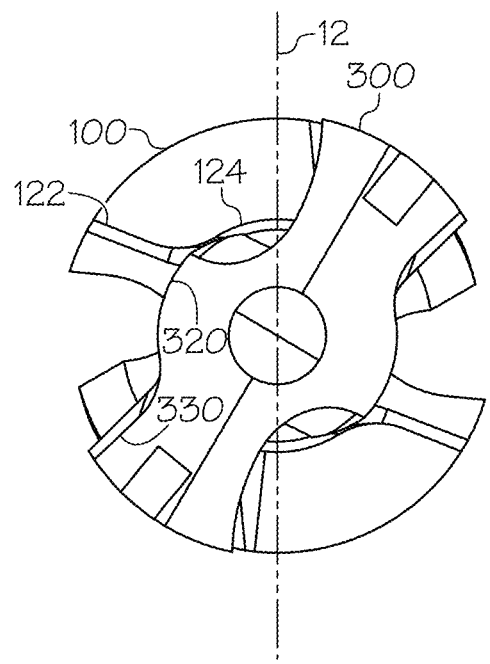
FIG. 7B is a top view of the shank and cutting tip of FIG. 7A.

As shown in FIGS. 7A and 7B, to assemble the modular drill, the cutting tip 300 and connection shaft 400, which is coupled to the cutting tip, are starting to be inserted into the shank 100. Thus, the cutting tip 300 is positioned between the shank flanks 120 and the connection shaft 400 is inserted into the shank bore 130. Meanwhile, the guide pin tip 210 is guided into the guide path entrance 432 of the guide path 430.

Figure 8A:
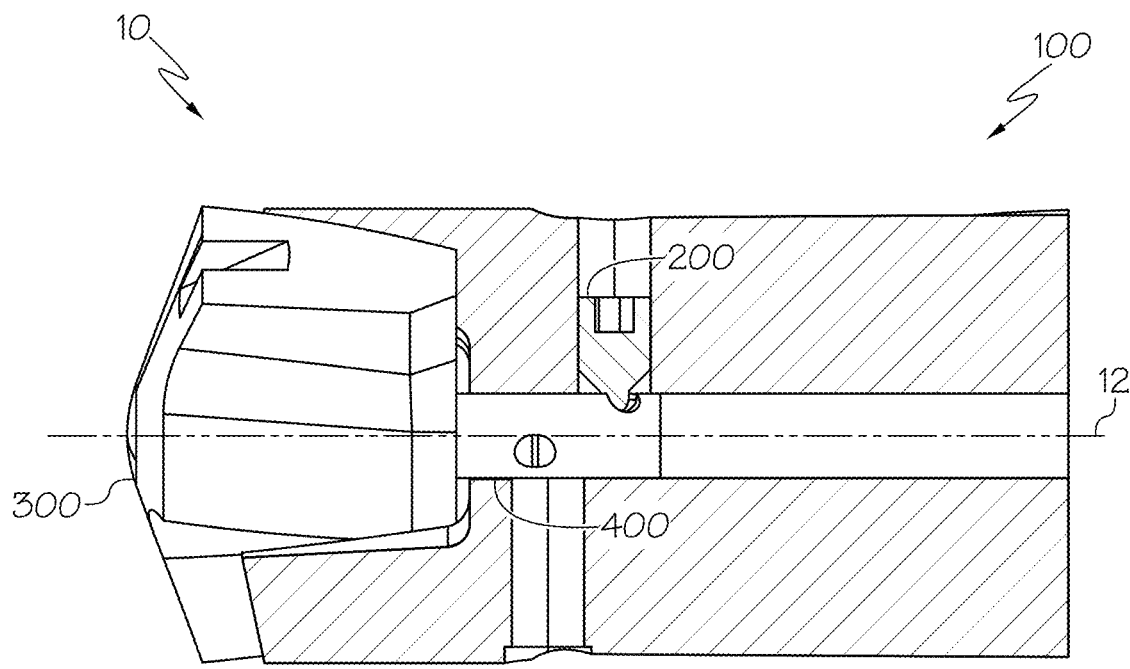
FIG. 8A is a sectional side view of the shank of FIG. 1 with non-sectional views of the cutting tip and connection shaft of FIG. 1, in which the cutting tip and connection shaft are positioned further into the shank.
Figure 8B:
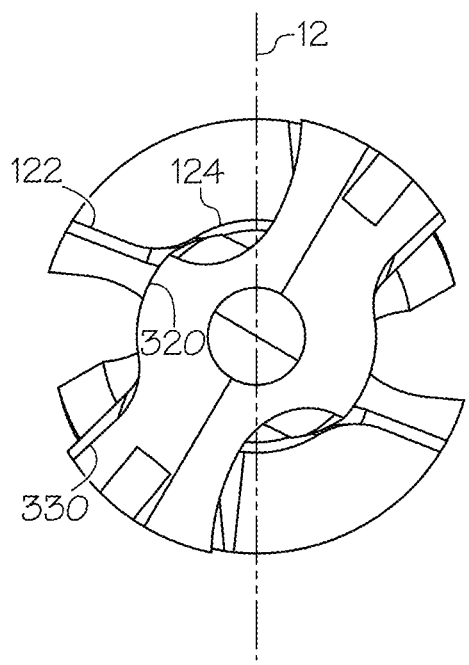
FIG. 8B is a top view of the shank and cutting tip of FIG. 8A.

As shown in FIGS. 8A and 8B, the cutting tip 300 and connection shaft 400 further inserted into the shank 100 in the axial direction 12. Meanwhile, the guide pin tip 210 is guided in axial direction 12 through the axial guide path segment 434 of the guide path 430.

Figure 9A:
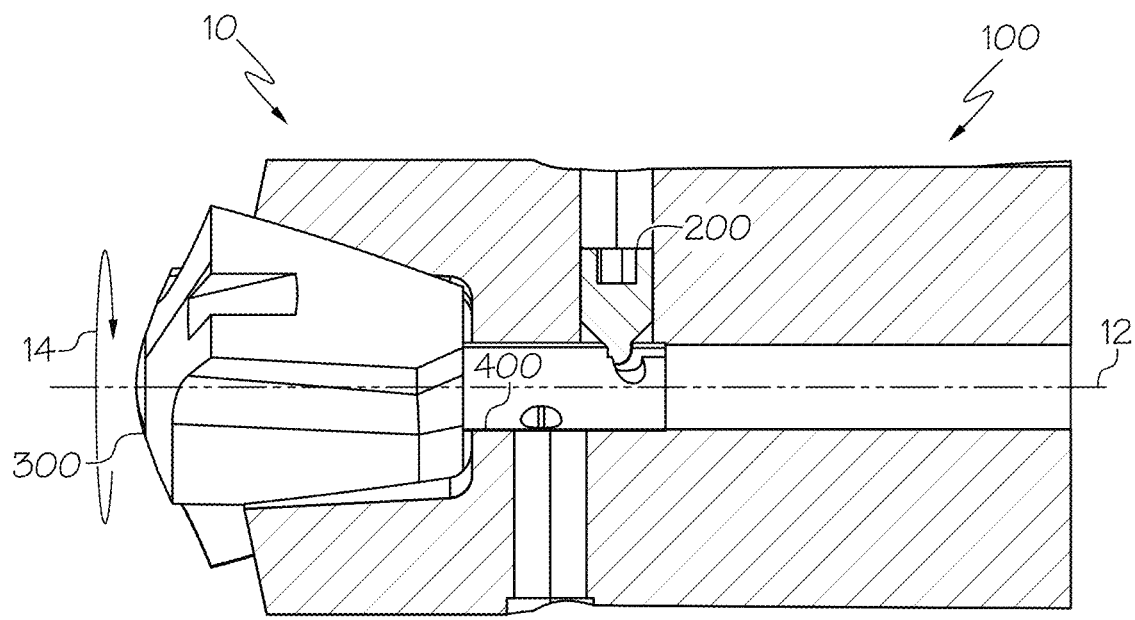
FIG. 9A is a sectional side view of the shank of FIG. 1 with non-sectional views of the cutting tip and connection shaft of FIG. 1, in which the cutting tip and connection shaft are positioned further into the shank and rotated with respect to the shank.
Figure 9B:
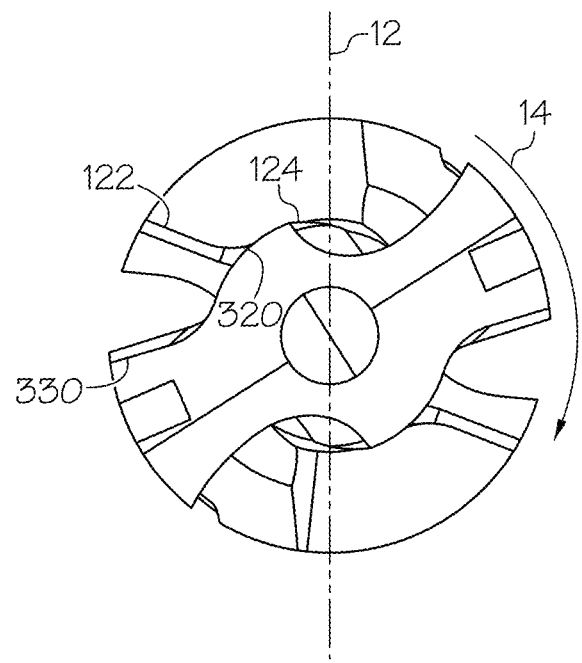
FIG. 9B is a top view of the shank and cutting tip of FIG. 9A.

As shown in FIGS. 9A and 9B, the cutting tip 300 and connection shaft 400 are inserted further into the shank 100 and rotated clockwise with respect to the shank 100 in rotational direction 14. The guide pin tip 210 is guided in both axial direction 12 and rotational direction 14 through the circumferential guide path segment 436 of the guide path 430. Meanwhile, during rotation of the cutting tip 300, the cutting tip shoulder surface 320 contacts the flank front surfaces 122 to deform the shank flanks 120 radially outwardly.

Figure 10A:
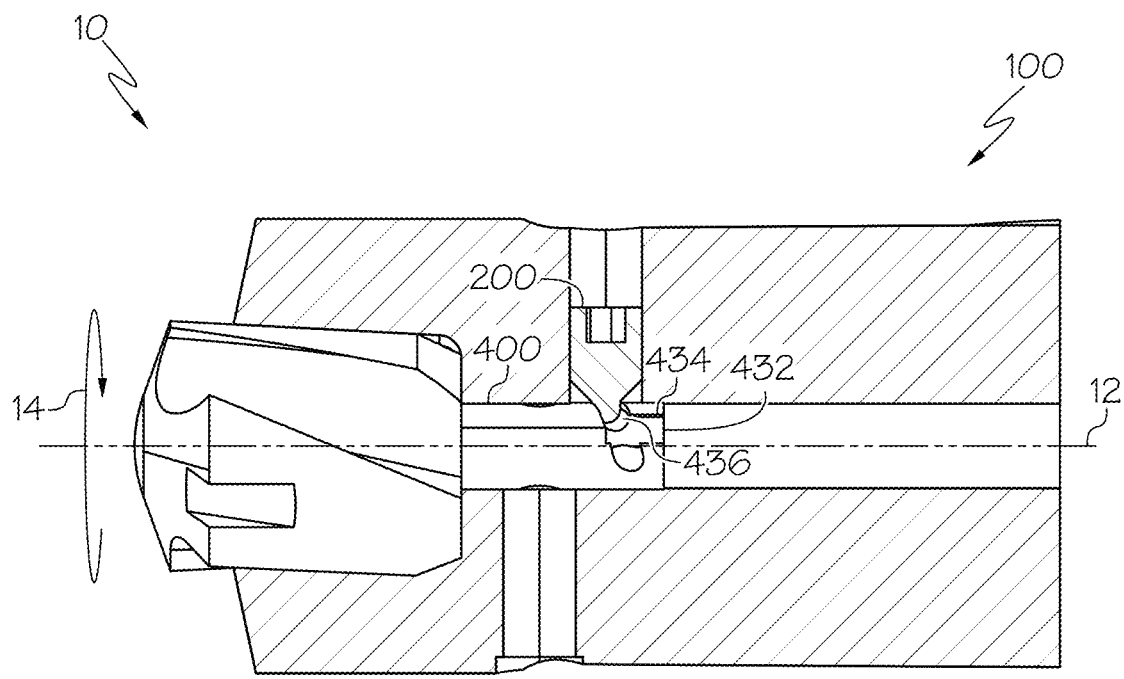
FIG. 10A is a sectional side view of the shank of FIG. 1 with non-sectional views of the cutting tip and connection shaft of FIG. 1, in which the cutting tip and connection shaft are positioned further into the shank and rotated with respect to the shank to a final position.
Figure 10B:
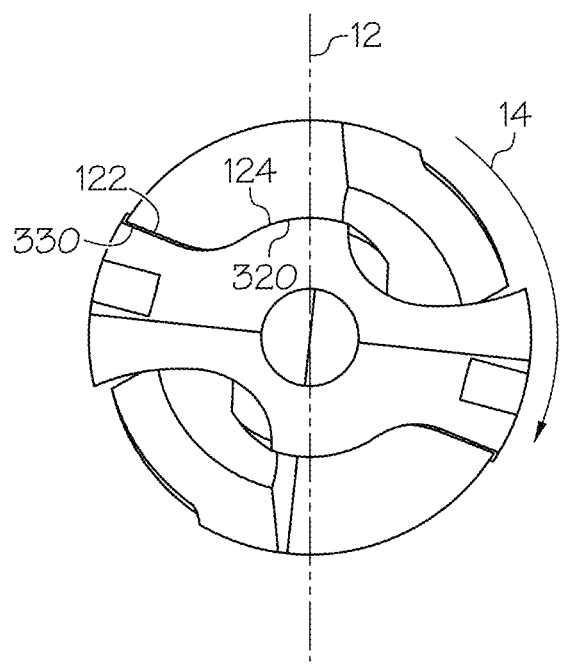
FIG. 10B is a top view of the shank and cutting tip of FIG. 10A.
Figure 11A:
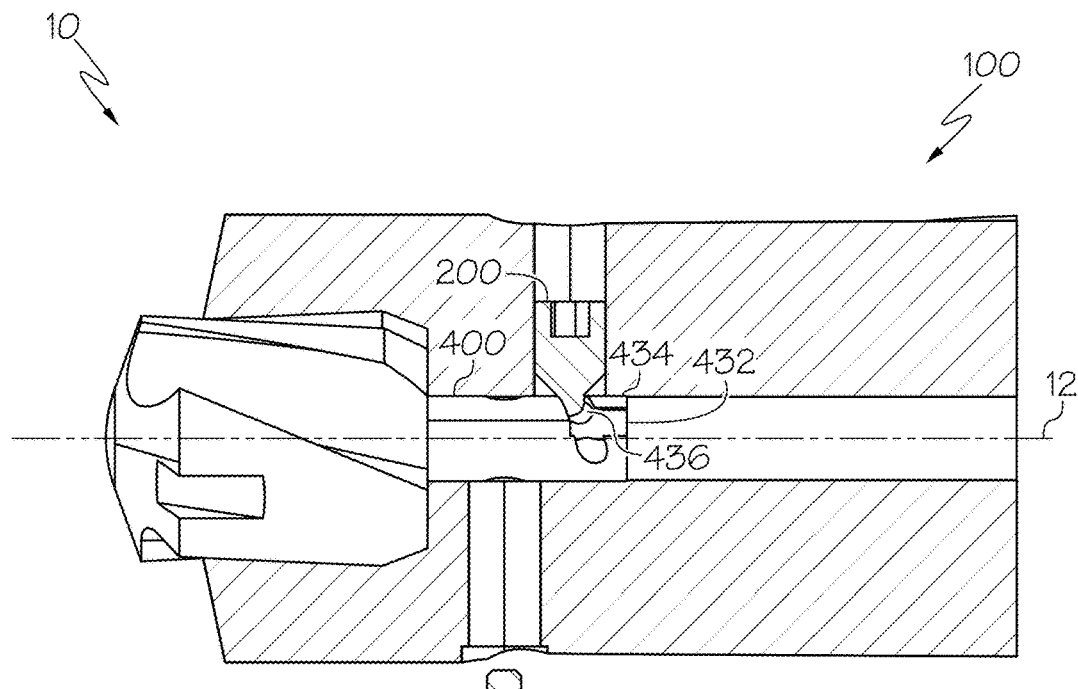
FIG. 11A is a sectional side view of the shank of FIG. 1 with non-sectional views of the cutting tip and connection shaft of FIG. 1, in which the cutting tip and connection shaft are at the final position and the locking pin of FIG. 1 is shown.
Figure 11B:
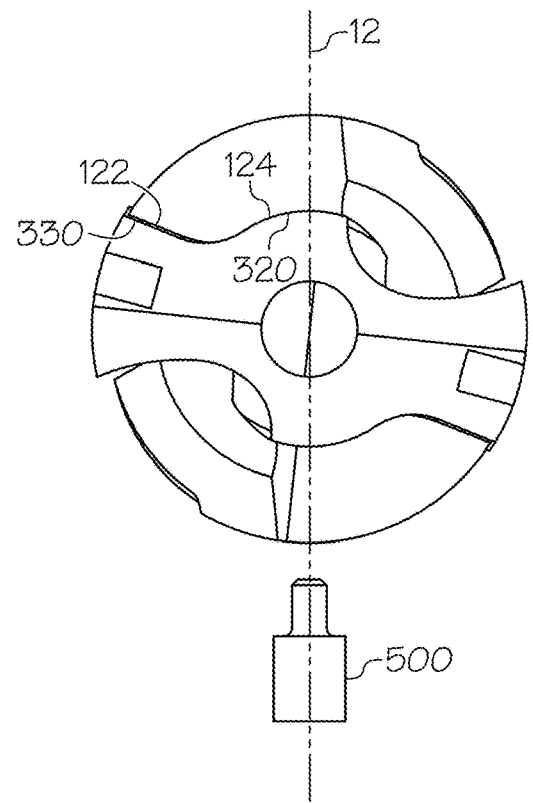
FIG. 11B is a top view of the shank and cutting tip of FIG. 11A.
Figure 12A:
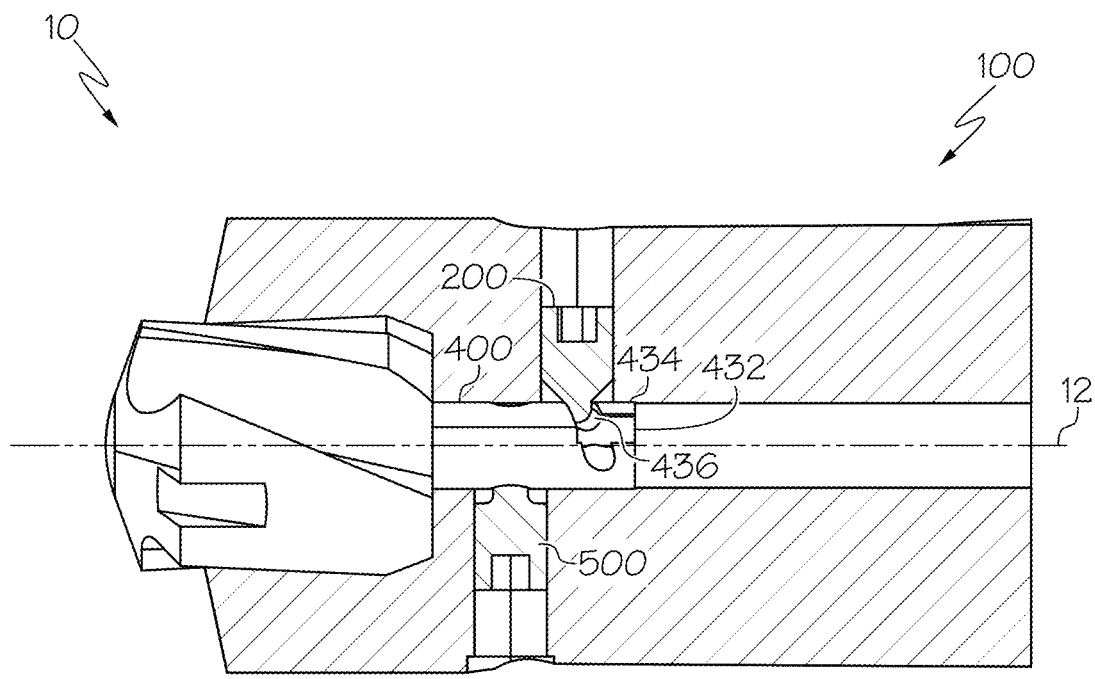
FIG. 12A is a sectional side view of the shank of FIG. 1 with non-sectional views of the cutting tip and connection shaft of FIG. 1, in which the cutting tip and connection shaft are at the final position and the locking pin of FIG. 1 is inserted through the shank and in engagement with the connection shaft.
Figure 12B:
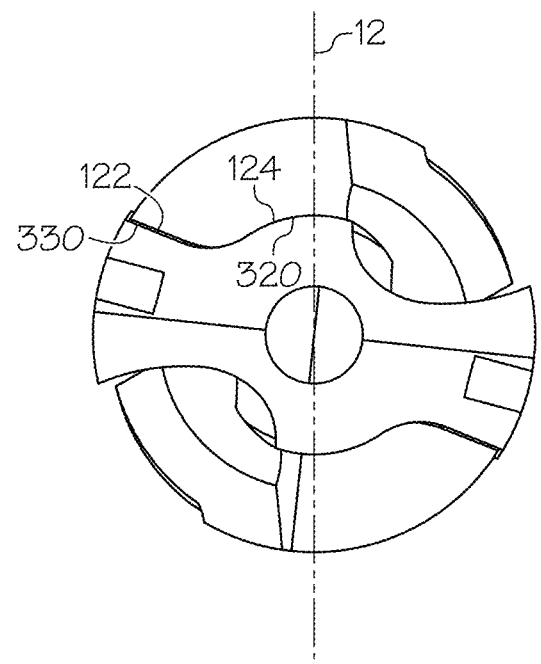
FIG. 12B is a top view of the shank and cutting tip of FIG. 12A.

As shown in FIGS. 10A and 10B, the cutting tip 300 and connection shaft 400 are inserted further into the shank 100 and rotated clockwise with respect to the shank 100 in rotational direction 14. Meanwhile, the cutting tip shoulder surface 320 passes the flank front surfaces 122 and the shank flanks 120 return towards their undeformed position to clamp the cutting tip 300 therebetween to hold the cutting tip 300 in a seated positioned in the shank pocket 110. In the seated position, the cutting tip counter surface 330 is positioned directly adjacent to the flank front surface 122 and the cutting tip shoulder surface 320 is positioned directly adjacent to the flank rear surface 124. Thus, the cutting tip 300 can be firmly held within the shank pocket 110 by the shank flanks 120 and engagement of the guide pin tip 212 with the guide path 430 while the modular drill 10 is cutting clockwise in the rotational direction 14.

As shown in FIGS. 11A, 11B, 12A, and 12B, the cutting tip 300 and connection shaft 400 remain at the final position and the locking pin 500 is inserted through the shank 100 and into engagement with the connection shaft 400.

To disassemble the modular drill 10, the order of FIGS. 7 to 11 can be viewed in reverse.

As shown in FIGS. 11A, 11B, 12A, and 12B, the cutting tip 300 and connection shaft 400 are at seated position and the locking pin 500 is removed from engagement with the connection shaft 400 and from the shank 100. If the locking pin 500 is omitted, the disassembly the modular drill 10 may start at FIGS. 10A and 10B.

As shown in FIGS. 9A and 9B, the cutting tip 300 and connection shaft 400 are pulled away the shank 100 in the axial direction 12 and rotated counterclockwise with respect to the shank 100 in the rotational direction 14. The guide pin tip 210 is guided in both axial direction 12 and rotational direction 14 through the circumferential guide path segment 436 of the guide path 430. Meanwhile, during rotation of the cutting tip 300, the cutting tip shoulder surface 320 contacts the flank front surfaces 122 to deform the shank flanks 120 radially outwardly.

As shown in FIGS. 8A and 8B, the cutting tip 300 and connection shaft 400 are pulled further away the shank 100 in the axial direction 12 and rotated counterclockwise further with respect to the shank 100 in the rotational direction 14. The guide pin tip 210 is guided in both axial direction 12 and rotational direction 14 further through the circumferential guide path segment 436 of the guide path 430. Meanwhile, the cutting tip shoulder surface 320 passes the flank front surfaces 122 and the shank flanks 120 return towards their undeformed position.

As shown in FIGS. 7A and 7B, the cutting tip 300 and connection shaft 400, which is coupled to the cutting tip are pulled further away the shank 100 in the axial direction 12. Meanwhile, the guide pin tip 210 is guided out of the guide path entrance 432 of the guide path 430. To complete the disassembly of the modular drill, the cutting tip 300 and connection shaft 400 are removed from the shank 100. Thus, the cutting tip 300 is pulled away from between the shank flanks 120 and the connection shaft 400 is pulled out of the shank bore 130.

Thus, to assemble the modular drill 10, the cutting tip 300 is rotated clockwise in direction 14, and the cutting tip 300 is correspondingly pulled down in axial direction 12 due to the contact of guide pin tip 210 and the guide path 430. To disassemble the modular drill 10, the cutting tip 300 is rotated counterclockwise in direction 14, and the cutting tip 300 is correspondingly pushed up in axial direction 12 due to the contact of guide pin tip 210 and the guide path 430, and the cutting tip 300 can be removed from the shank 100.

Advantages of the modular drill of the present disclosure may include ease of removing and inserting of the cutting tip, high stiffness and reliability of retaining of the cutting tip within the modular drill, and the use of conventional materials.

Although various embodiments of the disclosed modular drill have been shown and described, modifications may occur to those skilled in the art upon reading the specification. The present application includes such modifications and is limited only by the scope of the claims.

What is claimed is:
1. A modular drill comprising:
a shank having a shank bore therein;
a guide pin tip disposed in the shank bore;
a cutting tip; and
a connection shaft extending in an axial direction and coupled to the cutting tip, the connection shaft having an outer surface comprising a guide path therein for guiding the guide pin tip therethrough while the connection shaft moves through the shank bore, wherein the guide path comprises an axial guide path segment and a substantially helical circumferential guide path segment, the circumferential guide path segment extending simultaneously in a circumferential direction around the outer surface and along the axial direction of the connection shaft.

2. The modular drill of claim 1, wherein the shank includes a plurality of shank flutes.

3. The modular drill of claim 1, wherein the cutting tip includes a plurality of cutting tip flutes.

4. The modular drill of claim 1, wherein the shank includes a plurality of shank flanks for clamping the cutting tip therebetween.

5. The modular drill of claim 4, wherein the plurality of shank flanks each include a flank front surface and flank back surface.

6. The modular drill of claim 1, wherein the cutting tip includes a cutting tip shoulder surface and a cutting tip counter surface.

7. The modular drill of claim 1, further comprising a locking pin.

8. The modular drill of claim 1, wherein the shank includes a locking pin through hole.

9. The modular drill of claim 1, wherein the connection shaft includes a locking pin engagement feature.

10. A method for using a modular drill of claim 1, the method comprising:
    moving a connection shaft through a shank bore of a shank, the connection shaft coupled to a cutting tip, the connection shaft having a guide path therein; and
    guiding a guide pin tip, which is disposed in the shank bore, through the guide path while the connection shaft moves through the shank bore of the shank.

11. The method of claim 10, wherein moving the connection shaft through the shank bore of the shank comprises inserting the connection shaft into the shank bore to assemble the modular drill.

12. The method of claim 10, wherein moving the connection shaft through the shank bore of the shank comprises removing the connection shaft from the shank bore to disassemble the modular drill.

13. The method of claim 10, wherein the step of guiding the guide pin tip includes guiding the guide pin tip along the guide path in a circumferential direction and an axial direction simultaneously.

14. The method of claim 10, wherein the step of moving the connection shaft through the shank bore includes:
    engaging a cutting tip shoulder surface of the cutting tip with a surface of a shank flank of the flank; and
    elastically biasing the shank flank in a radially outward direction as the connection shaft is moved radially within the shank bore.

15. The modular drill of claim 9, wherein the locking pin engagement feature comprises a hole formed in the connection shaft.

16. The modular drill of claim 15, wherein the hole is formed through the connection shaft.

17. The modular drill of claim 15, wherein the hole is oblong.

18. The modular drill of claim 17, wherein the oblong hole is elongated in the axial direction.

19. The modular drill of claim 6, wherein the cutting tip shoulder surface is arranged at a first radial distance from a central axis of the drill, and a portion of the flank front surface opposing the cutting tip shoulder surface is arranged at a second radial distance from the central axis of the drill, less than the first radial distance.

20. The modular drill of claim 19, wherein as the guide pin tip is guided through the circumferential guide path, the cutting tip shoulder surface is adapted to engage with the opposing portion of the flank front surface and elastically deform the shank flank in a radially outward direction.

* * * * *